United States Patent [19]

Mann

[11] Patent Number: 5,366,528
[45] Date of Patent: Nov. 22, 1994

[54] PARISON FORMING AND PLUNGERS FOR USE THEREIN

[75] Inventor: Philip A. Mann, Pontefract, United Kingdom

[73] Assignee: Emhart Glass Machinery Investments Inc., Wilmington, Del.

[21] Appl. No.: 147,999

[22] Filed: Nov. 5, 1993

[30] Foreign Application Priority Data

Nov. 13, 1992 [GB] United Kingdom ............. 9223839.3
Sep. 2, 1993 [GB] United Kingdom ............. 9318223.6

[51] Int. Cl.⁵ .......................................... C03B 11/10
[52] U.S. Cl. ........................................ 65/25.1; 65/362; 65/68; 65/182.2; 65/319
[58] Field of Search ................. 65/82, 362, 25.1, 356, 65/84, 85, 319, 182.2, 68

[56] References Cited

U.S. PATENT DOCUMENTS 3,484,510 12/1969 Corazza ................................ 65/68
3,671,211 6/1972 Lloyd .................................. 65/362
4,585,467 4/1986 Trahan ................................ 65/362
4,798,617 1/1989 Foster ................................ 65/25.1
5,078,769 1/1992 Trier .................................. 65/319
5,236,485 8/1993 Leweringhaus ...................... 65/362

FOREIGN PATENT DOCUMENTS

48-21347 6/1973 Japan ............................... 65/182.2

*Primary Examiner*—W. Gary Jones
*Assistant Examiner*—John Hoffmann
*Attorney, Agent, or Firm*—Spencer T. Smith

[57] ABSTRACT

A plunger assembly for a glassware forming machine for use in forming parisons comprises a metal plunger with a small chamber at the nose portion of the plunger into which water is supplied when the plunger is in use, the water passing out through a pattern of small holes in the nose portion to provide a vapour barrier between the plunger and the hot glass. The plunger has an internal recess and is cooled by air supplied into the recess.

17 Claims, 6 Drawing Sheets

PARISON FORMING AND PLUNGERS FOR USE THEREIN

This invention is concerned with the formation of parisons in the manufacture of glass bottles and the like, and with plungers for use in such formation.

BACKGROUND TO THE INVENTION

A well established method of manufacturing glass bottles and the like is the "press and blow" method in which a gob of molten glass is supplied to a parison mould, a plunger is pressed into the glass to provide a hollow parison, and the hollow parison is transferred to a blow mould to be blown into a bottle of the required final shape.

The pressing operation is one which is critical to the quality of the eventual bottle, and much consideration has in recent years been given to precise control of the movement of the plunger and also to plungers of various constructions.

In European Patent Application 405387, a plunger is described which is of open pore material, specifically sintered metal, and a parison forming operation described in which while the plunger is pressing molten glass into a parison mould, a predetermined quantity of water is supplied to the interior of the plunger, out through the pores of the plunger, to provide a separating vapour layer between the plunger surface and the glass.

The parison forming operation carried out according to the instructions in EP-A-0405387 shows some significant advantages over a conventional parison forming operation using a solid metal plunger, in particular in that the interior surface of the parison (and, consequently of the blown bottle) is remarkably free from minute defects, the presence of which reduces the strength of the blown bottle. However, the operation also suffers from a major defect, which reduces the commercial usefulness of the operation, and which is that bottles formed by this method are particularly prone to show defects (checks) in the neck portions of the bottles, which defects renders the bottles commercially unacceptable.

Attempts to overcome this problem with porous plunger by use of a plunger of variable porosity, or by use of an impermeable barrier around the plunger in the region of the neck area of the plunger are described in DE 4028005 and DE 4028028, but neither have been sufficiently successful to make the use of a porous plunger to provide a separating vapour layer between the plunger surface and the glass in the formation of a parison a commercially successful process.

It is an object of the present invention to provide an improved plunger assembly for use in forming parisons in a glassware forming machine.

It is another object of the present invention to provide an improved method of forming a parison in a glassware forming machine.

BRIEF STATEMENT OF THE INVENTION

The present invention provides as one of its features a plunger assembly for use in forming parisons in a glassware forming machine comprising
- a metal plunger having an internal recess extending from a base of the plunger to a closed nose portion of the plunger,
- a barrier in the recess providing a small chamber at the nose portion,
- a pattern of small holes extending through the nose portion from the chamber to the exterior of the plunger,
- a pipe extending from the base to the barrier and through which water can be supplied to the chamber,
- and means for supplying cooling air to the recess.

Preferably a plunger assembly according to the invention comprises a sleeve extending around the pipe whereby the cooling air may be supplied to move upwards between the sleeve and the pipe and then downwards between the sleeve and the interior surface of the plunger.

Preferably in a plunger assembly according to the invention, the small chamber is approximately hemispherical in shape. It may conveniently have a volume of between 0.09 cc and 0.5 cc, preferably approximately 0.4 cc.

The nose portion of the plunger assembly is generally hemispherical in shape, and preferably the small holes extend radially from an axial centre in the nose portion.

The holes may be between 0.25 mm and 1.0 mm in diameter.

Preferably from about 0.25 cc to about 6.00 cc of water is used in each parison forming operation.

The present invention also provides as another of its features a method of forming a parison in a glassware forming machine comprising the steps of
(a) supplying a gob of molten glass to a parison mould
(b) advancing a plunger assembly as set out in the last preceding paragraph but five into the gob while providing cooling air to the recess.
(c) supplying a measured quantity of water to the chamber of the plunger assembly
(d) completing the advancing movement of the plunger assembly to form the parison,
(e) withdrawing the parison

BRIEF DESCRIPTION OF THE DRAWINGS

Two plunger assemblies embodying the invention will now be described with reference to the accompanying drawings in which.

DESCRIPTION OF THE INVENTION

Figure 1:
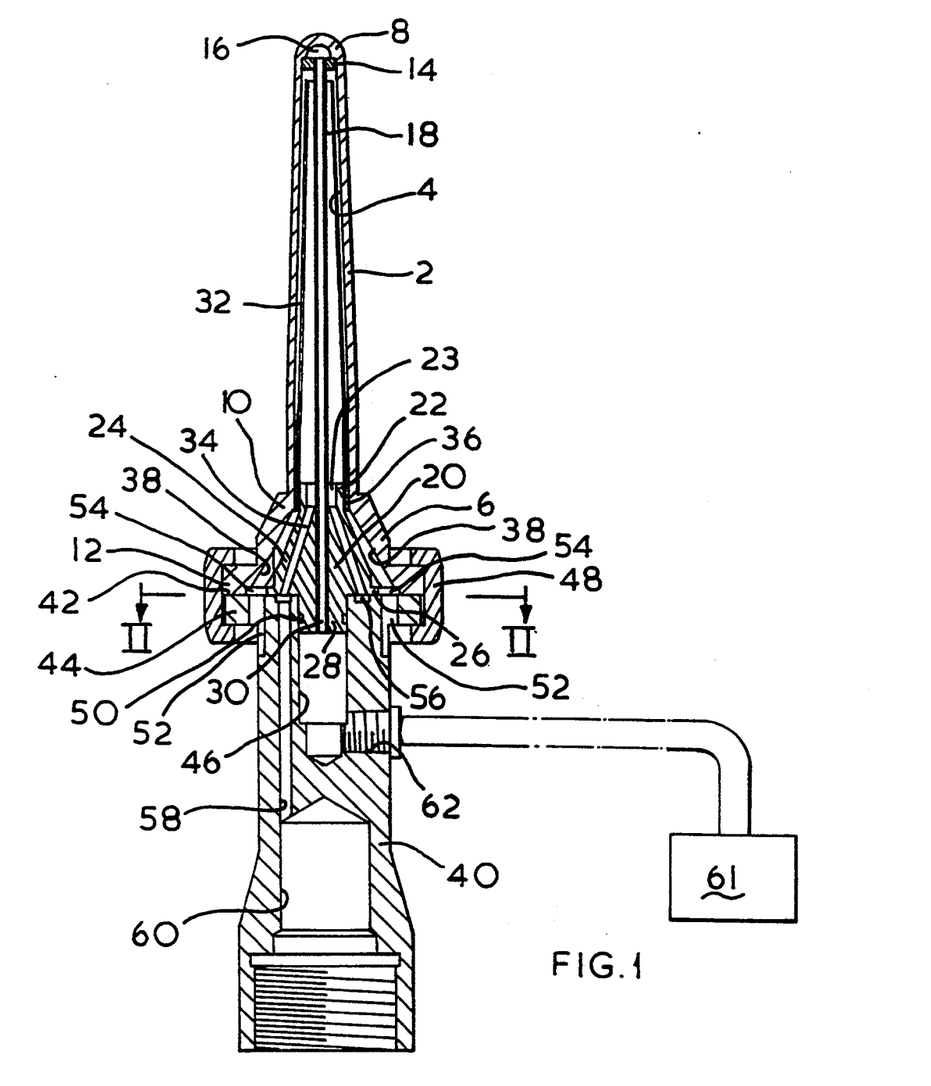
FIG. 1 shows a view in section of a first plunger assembly embodying the invention
Figure 2:
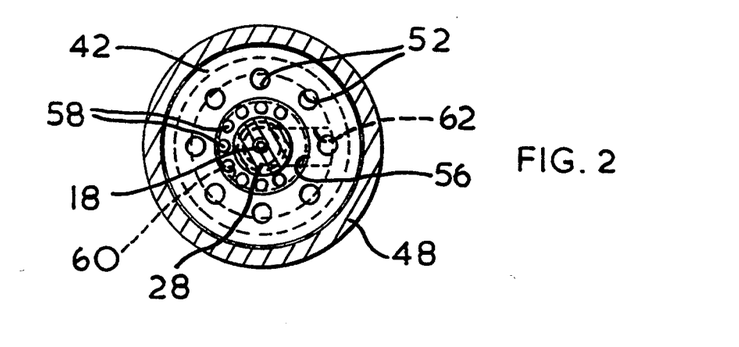
FIG. 2 shows a view in section along the line II of FIG. 1

The first plunger assembly shown in FIG. 1 is for the manufacture of 33 cl. beer bottles by a press and blow process, and comprises a plunger 2 about 15 cm in length having an internal recess 4 extending from an enlarged base 6 of the plunger to a closed nose portion 8. The plunger 2 is constructed of nickel steel and has a smooth polished outer surface. It tapers at an angle of about 1.6°, and has a diameter just above the base of 1.8 cm. The base 6 comprises an enlarged portion 10 and an outwardly extending flange portion 12.

Fixed in the recess 4 of the plunger towards the nose portion 8 is a barrier 14, providing a small chamber 16 which is approximately hemispherical in shape and has a volume of about 0.09 cc, in the nose portion. A central pipe 18 having a bore of about 2.16 mm diameter extends from the chamber 16 through the barrier 14 to a core member 20 secured in the base 6. The core member 20 comprises an upwardly extending ring shaped projection 22 which extends a short way into the recess 4 and provides a recess 23 extending around the pipe 18, a generally conical portion 24, which lies in the enlarged portion 10 of base, a narrow, outwardly extending flange 26, and a downwardly extending boss 28. Centrally of the core member 20 is an axial passage 30 which extends from the pipe 18 and through the boss 28.

Surrounding the pipe 18 and extending from a position short of the barrier 14 to the ring shaped projection 22 is a sleeve 32. A series of conically arranged passageways 34 extend from a bottom face of the recess 23 downwardly through the core member 20.

As will be described in detail later, the pipe 18 serves to provide a passageway through which water may be supplied to the chamber 16, while cooling air for the plunger 2 is provided upwardly through the passageways 34, through the recess 23, up through the sleeve 32 along the pipe 18, downwardly between the sleeve 32 and the interior surface of the plunger, through an annular space 36 formed between the ring shaped projection 22 and the plunger 2, around the outside of the core member 20 to a series of outlet passages 38 provided in the base 6.

The plunger 2 is secured to an adapter 40 of a plunger operating mechanism (not shown). The adapter 40 has a flat upper surface 42 and a flange 44. A central bore 46 extends downwardly from the surface 42. A split collar 48 surrounds the flange 44 of the adapter 40 and the flange portion 12 of the plunger base 6 and secures the plunger 2 to the adapter 40. The boss 28 of the core member 20 fits into the bore 46, and is sealed by an O-ring 50.

A series of exhaust passageways 52 extend downwardly from the surface 42 in the flange 44, and open into an annular groove 54 formed in the base 6, the outlet passageways 38 of the base 6 also opening into the groove 54.

An annular groove 56 is formed in the surface 42, and the passageways 34 of the core member 20 open into this groove 56. A series of circularly spaced vertical passages 58 in the adaptor 40 lead from the groove 56 to a central bore 60 through which as is conventional cooling air may be supplied.

The axial passage 30 opens into the central bore 46 of the adaptor 40, and leads to a transverse bore 62 through which, as will be explained later, water may be supplied through the central pipe 18 to the chamber 16 from a metering pump 61.

In FIGS. 3A–6B, four possible configurations of the nose portion 8 of the plunger 2 are shown. Each of these nose portions is of the same general arrangement, but has a series of passageways leading from the small chamber 16 to the exterior of the nose portion 8. The nose portion 8 in each instance is generally hemispherical in shape. The passageways extend radially from an axial centre in the nose portion, in fact from the centre of the nose portion 8.

In the first configuration, (FIGS. 3A and 3B) thirteen radial passageways 64 are provided. These passageways are each 0.25 mm in diameter and are arranged equally spaced around two cones, 4 passageways in an inner cone, 8 passageways in an outer cone and one central passageway.

In the second configuration (FIG. 4A and 4B) seven radial passageways are provided, an axial passageway 66 of 1.0 mm diameter, and six equally spaced passageways 68 of 0.5 mm diameter arranged around a 90° cone.

In the third configuration (FIGS. 5A and 5B) eight radial passageways are provided, four equally spaced passageways 70 around a 50° cone, and four equally spaced passageways 72 around a 90° cone. The passageways are of 0.5 mm diameter.

In the fourth configuration (FIGS. 6A and 6B) four radial passageways are provided, an axial passageway 74 and three equally spaced passageways 76 around a 90° cone. The passageways are 1.0 mm diameter.

Figure 7:
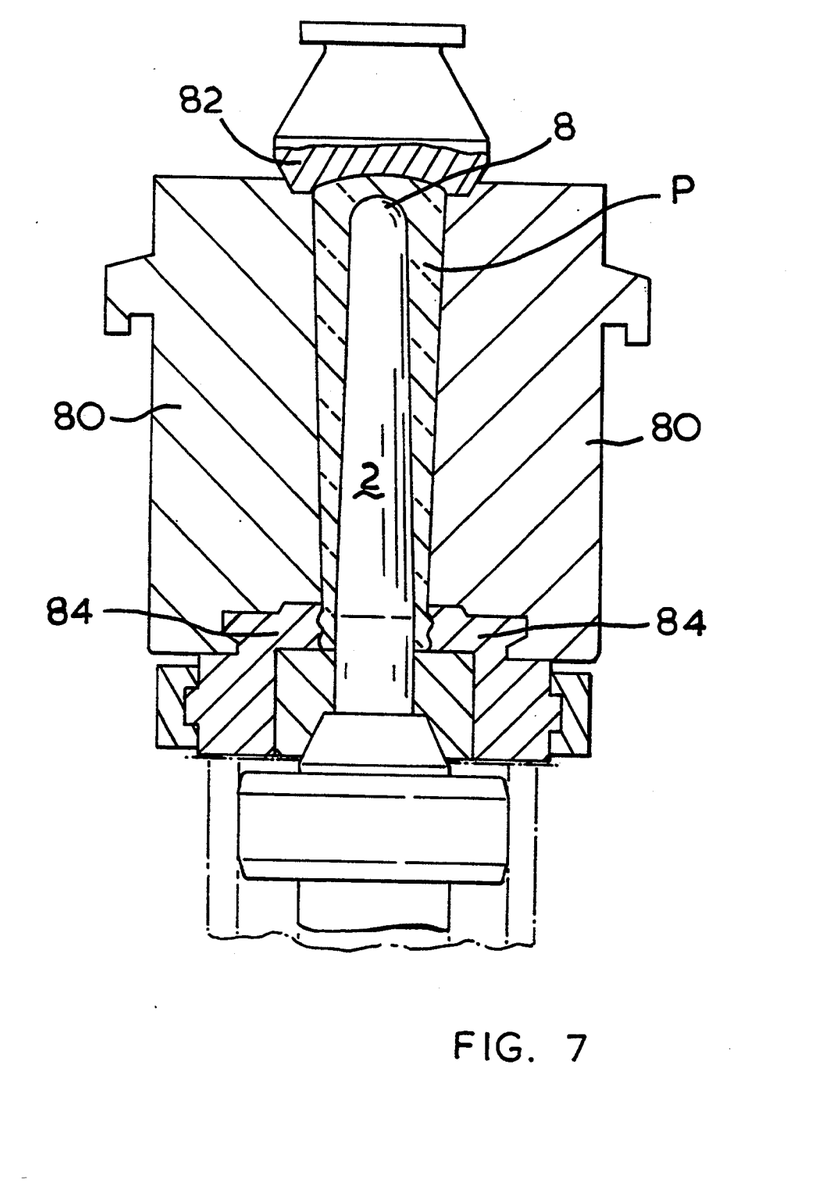
FIG. 7 shows, diagrammatically, the use of the first plunger assembly in forming a parison.

The use of the first plunger assembly in forming a parison will now be described with particular reference to FIG. 7.

As is customary, the plunger 2 begins in a retracted position with the tip of the plunger extending a short way into a closed parison mould 80. A gob or molten glass is supplied to the parison mould and the mould cavity closed by a baffle 82. The plunger 2 is then advanced into the mould, pressing the molten glass against the walls of the mould cavity and into a neck ring 84 to form the parison P. About halfway through the pressing action of the plunger, about 0.25 cc of water is supplied through the transverse bore 62 up through the pipe 18 by the metering pump 61. The chamber 16 and the pipe 18, in the operation of the plunger 2, is maintained at a temperature well below 100° C., and thus the supply of a measured quantity of water by the pump 61 pushes the same quantity of water (viz. about 0.25 cc) out through the passageways in the nose portion 8. This water evaporates and provides a vapour barrier between the upper portion of the plunger 2 and the molten glass. All the time that the pressing operation is being carried out, cooling air is being provided to the plunger 2 from the bore 60, through the passageways 58, 34 upwards through the sleeve 32 and then downwards outside the sleeve 32, between the sleeve 32 and the interior surface of the plunger through the annular space 36, and the outlet passages 38 to the exhaust passageways 52. The plunger 2 continues to be advanced into the mould 80, until the parison is completely formed as shown in FIG. 7.

While it is preferred to use 0.25 cc of water in each parison forming operation, we have found that from about 0.25 cc to about 2.0 cc may be satisfactorily used in the first plunger assembly.

From observation of the surface of the plunger 2 after a number of pressing operations, it was noted that for a distance of about 25–30 mm from the tip of plunger no discoloration of the surface occurred, from which it can be deduced that an effective vapour barrier between the surface of the plunger and the interior surface of the molten glass was formed over this distance. Further it is noted that the cooling of the plunger is very effective and no hot spots, which are a common problem with conventional plunger, are developed.

It is believed that on repetition of the cycle, with the first plunger assembly enough residual water is present in the chamber 16 to provide a vapour barrier around the tip of the plunger when it first contacts the molten glass.

Figure 3A:
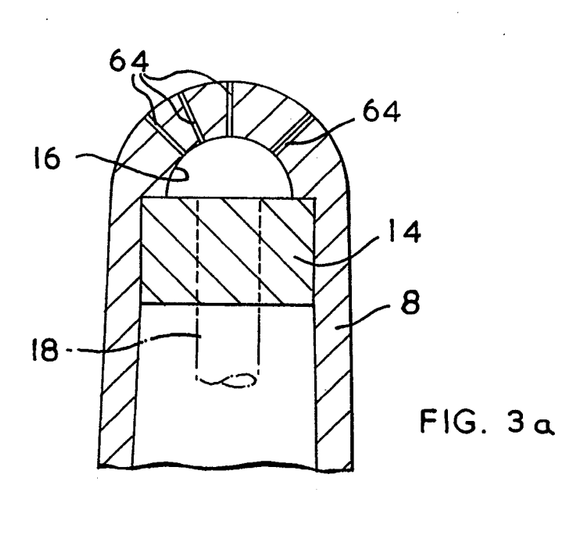
FIG. 3A, 3B, 4A, 4B, 5A, 5B and 6A, 6B show alternative configurations of a nose portion of the first plunger assembly.
Figure 3B:
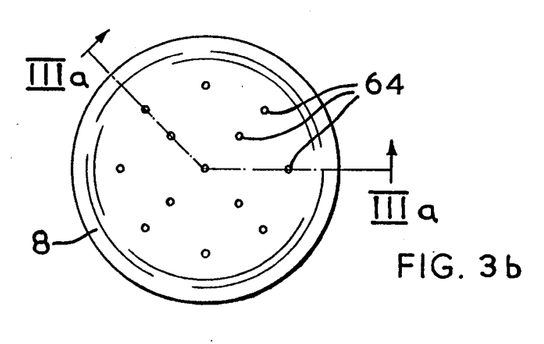
Figure 4A:
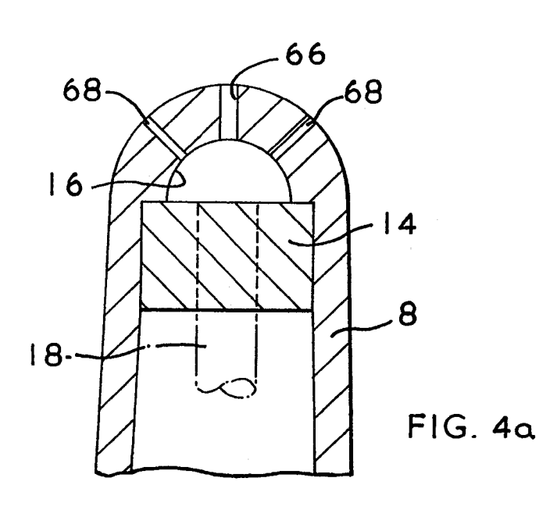
Figure 4B:
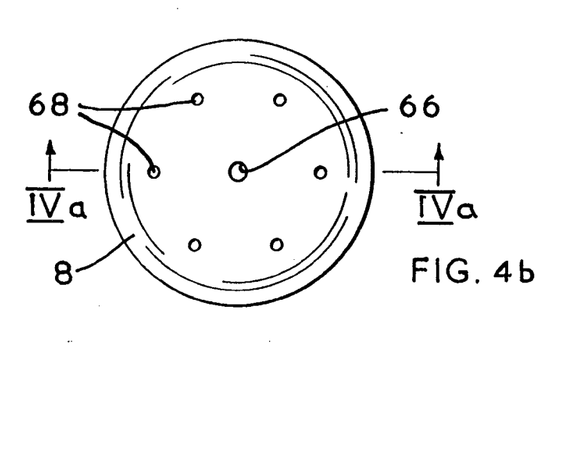
Figure 5A:
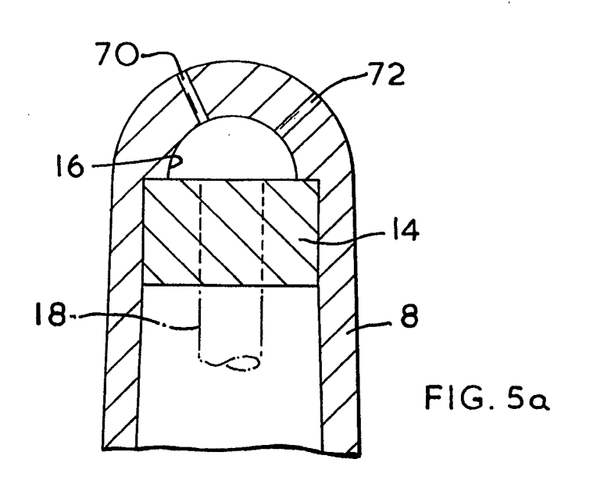
Figure 5B:
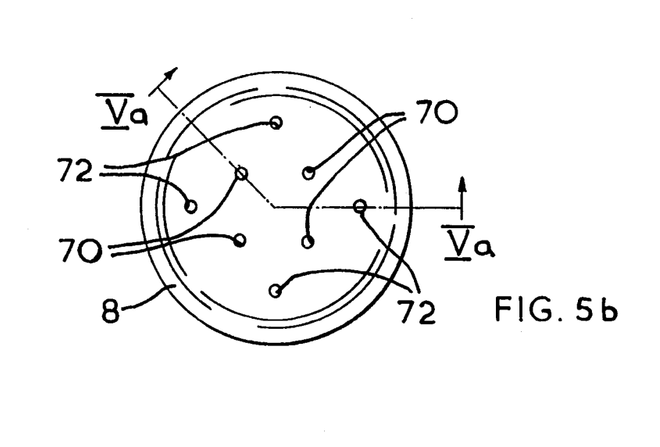
Figure 6A:
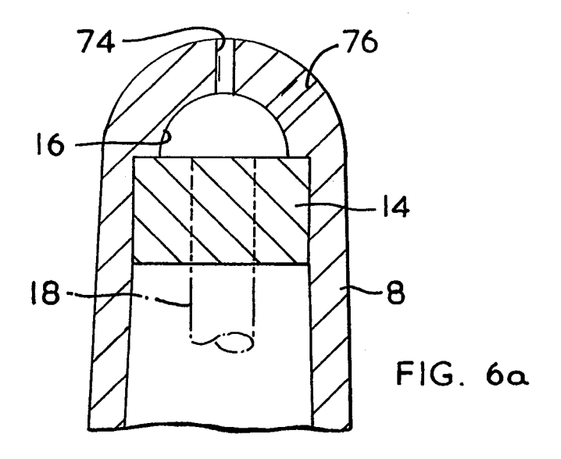
Figure 6B:
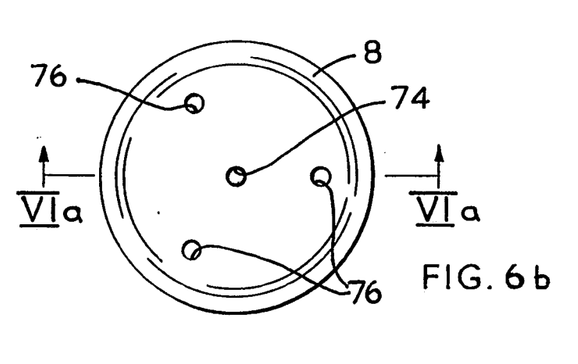

All the four configurations of the tip of the plunger 2 which have been described proved successful in operation, but the configuration shown in FIGS. 3A and 3B appears slightly preferable to the other configurations.

Figure 8:
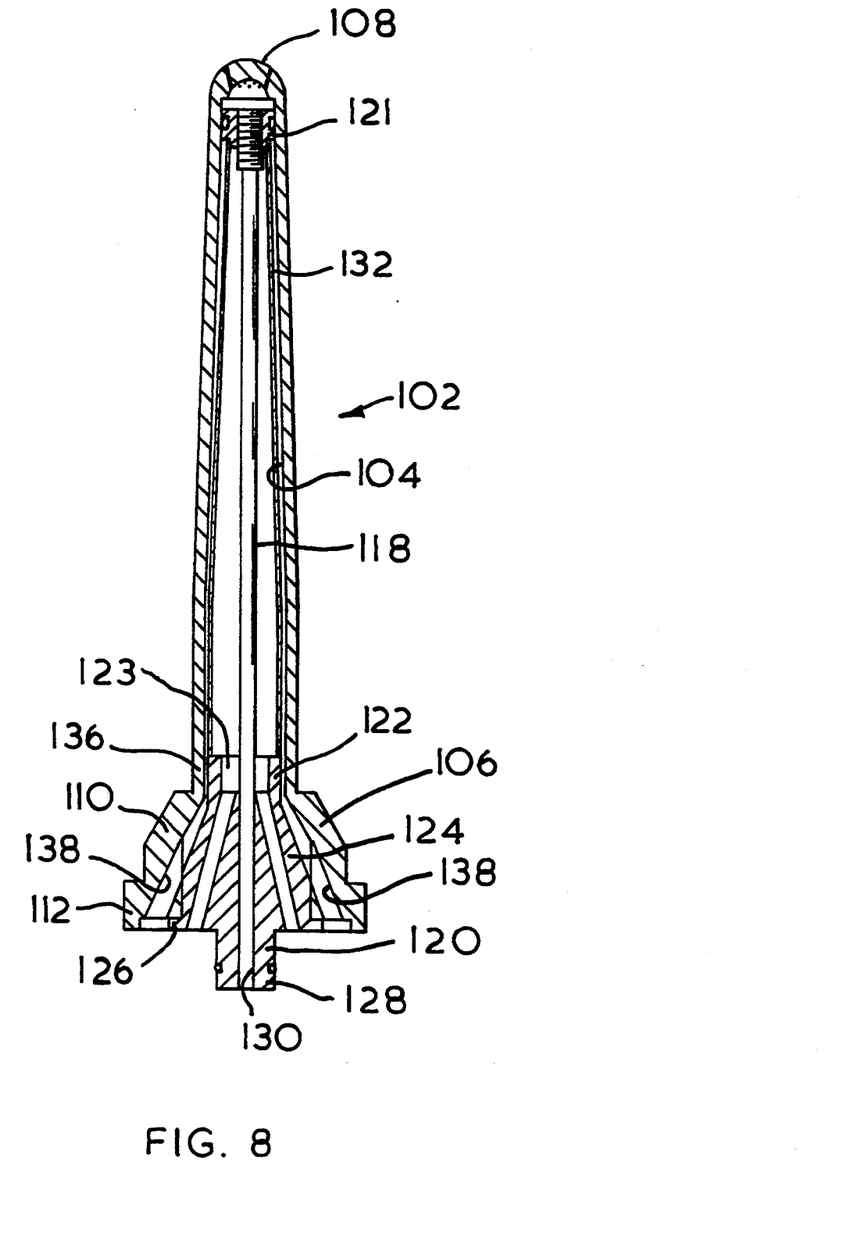
FIG. 8 shows a view in section, of a plunger of a second plunger assembly.

The second plunger assembly, partly shown in FIG. 8 is a preferred construction for the manufacture of 33 cl. beer bottle by a press and blow process, and comprises a plunger 102 extending from an enlarged base 106 of the plunger to a closed nose portion 108. The plunger 102 is constructed of nickel steel and has a smooth polished outer surface. It tapers at an angle of about 1.6°, and has a diameter just above the base of 1.8 cm. The base 110 comprises an enlarged portion 110 and an outwardly extending flange portion 112.

A central pipe 118 having a bore of about 2.16 mm diameter extends upwardly in the recess 104 from a core member 120 secured in the base 106.

A threaded end portion 119 secured to the pipe 118 is threaded into a plug 121 which is a force fit into the interior of the nose portion 108. The plug 121 is provided with an annular recess 129 which supports a sealing O-ring.

The plug 121 provides a barrier towards the upper end of the internal recess 104 to provide a chamber which comprises a hemispherical portion 116 and a cylindrical portion 117 of somewhat greater radius. The volume of the chamber is approximately 0.4 cc.

The core member 120 comprises an upwardly extending boss 122 which extends a short way into the recess 104 and is provided with a recess 123 extending around the pipe 18, a generally conical portion 124, which lies in the enlarged portion 110 of the base 106, a narrow, outwardly extending flange 126, and a downwardly extending boss 128. Centrally of the core member 120 is an axial passage 130 which extends from the pipe 118 and through the boss 128.

Surrounding the pipe 118 and extending from the plug 121 to the boss 112 is a sleeve 132. An upper end portion of the sleeve 132 fits over a reduced portion 125 of the plug 121, and is provided with four circumferentially spaced holes 127. A series of conically arranged passageways 134 extend from a bottom face of the recess 123 downwardly through the core member 120.

In a manner similar to that described with reference to the first plunger assembly, the pipe 118 serves to provide a passageway through which water may be supplied to the chamber 116, 117, while cooling air for the plunger 102 is provided upwardly through the passageways 134, through the recess 123, up through the sleeve 132 around the pipe 118, through the holes 127, downwardly between the sleeve 132 and the interior surface of the plunger, through an annular space 136 formed between the boss 22 and the plunger 102, around the outside of the core member 120 to a series of outlet passages 138 provided in the base 106.

The plunger 102 is secured to an adapter of a plunger operating mechanism (not shown) in exactly the same way as the plunger 2 of the first plunger assembly.

Figure 9:
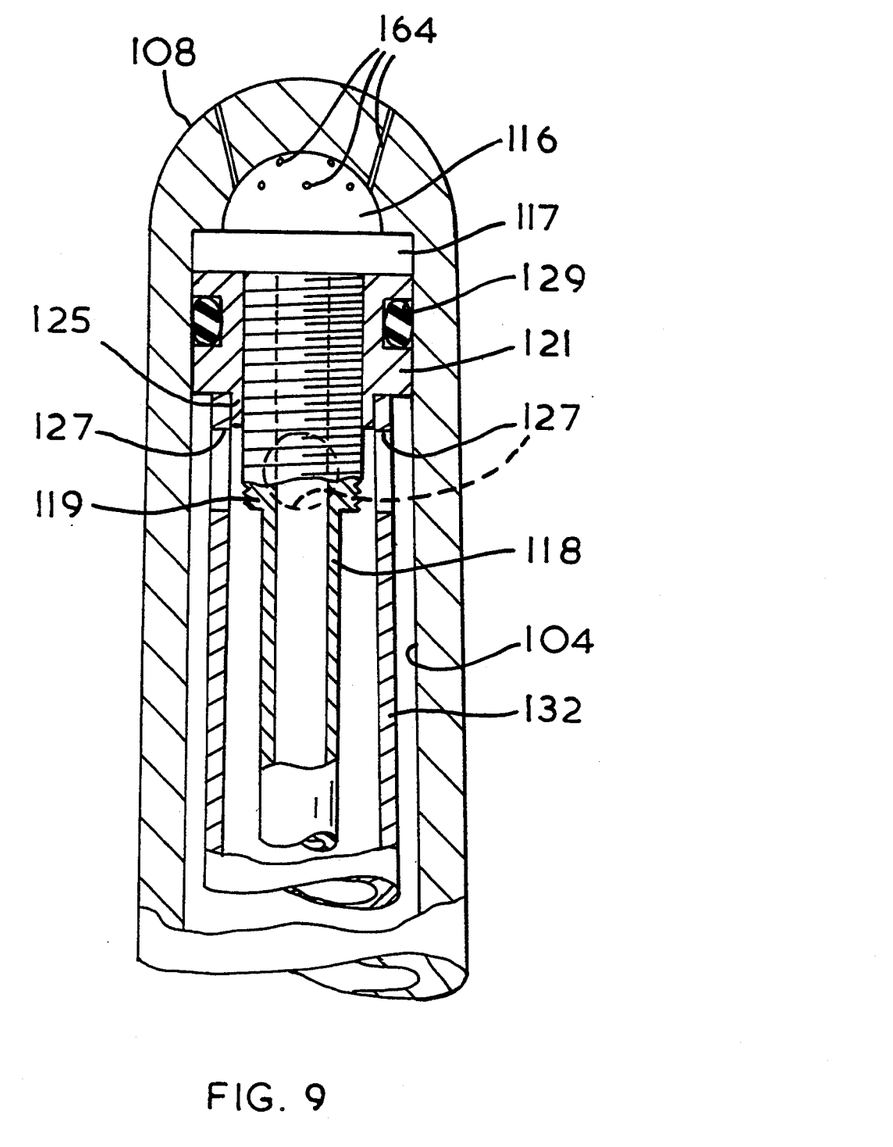
FIG. 9 shows an enlarged view of an end portion of the plunger of FIG. 8.

The nose portion 108 is provided with 12 passageways 164 which extend radially from an axial centre in the nose portion, in fact from a point approximately level with an upper end face of the sleeve 132. Eight of these passageways are equally spaced around a cone of 30° included angle and four around a cone of 15° included angle. The passageways are each 0.25 mm in diameter.

The use of the plunger assembly in forming a parison will now be described with particular reference to FIG. 7.

As is customary, the plunger 102 begins in a retracted position with the tip of the plunger extending a short way into a closed parison mould 80. A gob of molten glass is supplied to the parison mould and the mould cavity closed by the baffle 82. The plunger 102 is then advanced into the mould, pressing the molten glass against the walls of the mould cavity and into a neck ring 84 to form the parison P. The pump 61 used with the plunger of FIG. 8 is a constant pressure pump which is regulated by a flow regulator and a solenoid valve. Before the plunger 108 begins to move upwards into the gob of glass, water is injected through the pipe 118 at a constant pressure (about 100 psi) and injection continues until a short time before the plunger 108 is retracted from the formed parison. About 6 cc of water is injected for each parison forming operation, though less may successfully be used. The water supplied through the pipe 118 pushes water out through the passageways 164 in the nose portion 108. This water evaporates and provides a vapour barrier between the upper portion of the plunger 102 and the molten glass. All the time that the pressing operation is being carried out, cooling air is being provided to the plunger 102 upwards through the sleeve 132 and then downwards outside the sleeve 132, between the sleeve 132 and the interior surface of the plunger through the annular space 136, and the outlet passages 138. The plunger 102 continues to be advanced into the mould 80, until the parison is completely formed as shown in FIG. 7, and is then retracted From observation of the surface of the plunger 102 after a number of pressing operations, it was noted that for a distance of about 25–30 mm from the tip of plunger no discoloration of the surface occurred, from which it can be deduced that an effective vapour barrier between the surface of the plunger and the interior surface of the molten glass was formed over this distance. Further it is noted that the cooling of the plunger is very effective and no hot spots, which are a common problem with conventional plunger, are developed.

It is found that glass containers formed from parisons made as above described by use of either of the first and second plunger assemblies show a consistent reduction in internal flaws and improvement in glass distribution as compared with conventionally manufactured parisons, thus providing the containers with substantially improved bursting strength. At the same time, the number of containers which showed flaws in their neck portions was minimal, amounting to no more than the number which might occur in a conventional machine operating under optimum conditions. Thus a substantial and significant improvement over previous parison pressing methods utilising a vapour barrier between the glass and the plunger is obtained.

I claim:

1. A plunger assembly for use in forming parisons in a glassware forming machine comprising
    a metal plunger having a base, a closed nose portion and an internal recess extending from the base to the nose portion
    a barrier in the recess providing a small chamber at the nose portion,
    a pattern of small holes extending through the nose portion from the chamber to the exterior of the plunger, a pipe extending from the base to the barrier through which water can be supplied to the chamber, means for supply cooling air to the recess.

2. A plunger assembly according to claim 1 comprising a sleeve extending around the pipe, whereby the cooling air may be supplied to move upwards between the sleeve and the pipe and then downwards between the sleeve and the interior surface of the plunger.

3. A plunger assembly according to claims 1 wherein the small chamber is approximately hemispherical in shape.

4. A plunger assembly according to claim 3 wherein the chamber has a volume of between 0.09 cc and 0.5 cc.

5. A plunger assembly according to claim 4 wherein the chamber has a volume of approximately 0.4 cc.

6. A plunger assembly according to claim 1 in which the nose portion is generally hemispherical in shape.

7. A plunger assembly according to claim 6 wherein the small holes extend radially from an axial centre in the nose portion.

8. A plunger assembly according to claim 7 wherein the small holes extend generally radially of the nose portion.

9. A plunger assembly according to claim 1 in which the small holes are between 0.25 mm and 1.0 mm in diameter.

10. A method of forming a parison in a glassware forming machine comprising the steps of (a) supplying a gob of molten glass to a parison mould (b) advancing a plunger assembly according to claim 1 into the gob while providing cooling air to the recess, (c) supplying a measured quantity of water to the chamber of the plunger assembly (d) completing the advancing movement of the plunger assembly to form the parison, (e) withdrawing the plunger assembly.

11. A method according to claim 10 wherein the measured quantity of water is between 0.25 cc and 6.0 cc.

12. A method according to claim 11 wherein the chamber has a volume of between 0.09 cc and 0.5 cc.

13. A method according to claim 12 wherein the chamber has a volume of approximately 0.4 cc.

14. A method according to claim 13 wherein the measured quantity of water is about 0.6 cc.

15. A method according to claim 10 wherein the quantity of water is supplied about half way through movement of the plunger into the molten glass.

16. A method according to claim 10 wherein water is supplied to the chamber before the plunger begins to move upwards into the gob of glass, and the supply continues until a short time before the plunger is withdrawn from the formed parison.

17. A method according to claim 10 wherein the plunger assembly comprises a sleeve extending around the pipe and the cooling air is supplied to move upwards between the sleeve and the pipe and then downwards between the sleeve and the interior surface of the plunger.

* * * * *